United States Patent [19]

Mismas

[11] Patent Number: 5,810,115

[45] Date of Patent: Sep. 22, 1998

[54] PRESSURE BYPASS ACCESSORY FOR A SERIES PROGRESSIVE DIVIDER VALVE

[75] Inventor: James R. Mismas, Concord Township, Ohio

[73] Assignee: Lubriquip, Inc., Clevenland, Ohio

[21] Appl. No.: 742,212

[22] Filed: Oct. 31, 1996

[51] Int. Cl.$^6$ .................................................. F16N 27/00
[52] U.S. Cl. ........................... 184/7.4; 184/108; 137/557; 137/879; 137/881; 137/884
[58] Field of Search .................. 184/6.4, 7.4, 8, 184/29, 108; 137/557, 596.12, 881, 884, 879

[56] References Cited

U.S. PATENT DOCUMENTS

| | | |
|---|---|---|
| 3,223,198 | 12/1965 | Gruber . |
| 3,337,003 | 8/1967 | Acker . |
| 3,438,463 | 4/1969 | Gruber . |
| 3,467,222 | 9/1969 | Gruber . |
| 3,556,123 | 1/1971 | Smith . |
| 3,653,466 | 4/1972 | Fujita et al. . |
| 3,666,048 | 5/1972 | Zajaczkowski . |
| 4,168,723 | 9/1979 | Schneider ................................ 137/557 |
| 4,180,090 | 12/1979 | Bemba . |
| 4,364,452 | 12/1982 | Crago . |
| 4,570,677 | 2/1986 | Roxton et al. ........................... 137/557 |
| 4,630,527 | 12/1986 | Quin ........................................ 137/879 |
| 4,972,925 | 11/1990 | Saretzky . |
| 5,285,871 | 2/1994 | Sievenpiper . |
| 5,311,968 | 5/1994 | Pingel ...................................... 184/7.4 |
| 5,480,004 | 1/1996 | Snow . |

FOREIGN PATENT DOCUMENTS 525738   5/1955   Italy ........................................ 137/881

*Primary Examiner*—Christopher Verdier
*Attorney, Agent, or Firm*—Hill & Simpson

[57] ABSTRACT

In a series progressive divider valve having a number of identical valve units disposed adjacent to each other, each formed by a base member and a spool member having a movable spool therein, a manifold in the form of a plate which can be inserted between the base member and the spool member of a valve unit which modifies the flow of lubricant in the event one of the output ports becomes blocked or restricted. In the event such a blockage or restriction occurs, a relief valve disposed in the manifold plate is opened which establishes communication between two normally non-communicating bores which results in the re-routing of the lubricant to the succeeding valve unit. The manifold permits the overall output/lubricant delivery configuration of the divider valve to be continued in the event of such a blockage or restriction. The manifold may also be incorporated into the base or feeder unit as opposed to a separate plate and, in such an embodiment, the relief valve may be disposed in either the base unit or the feeder unit.

22 Claims, 3 Drawing Sheets

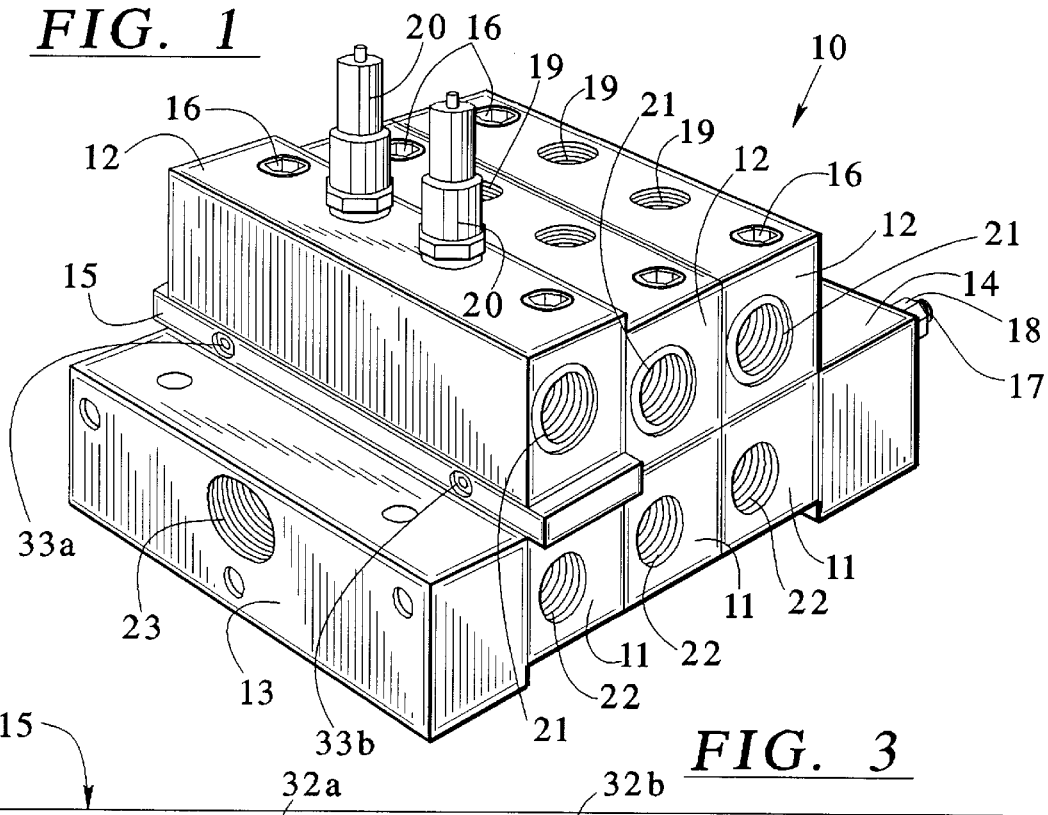
FIG. 1
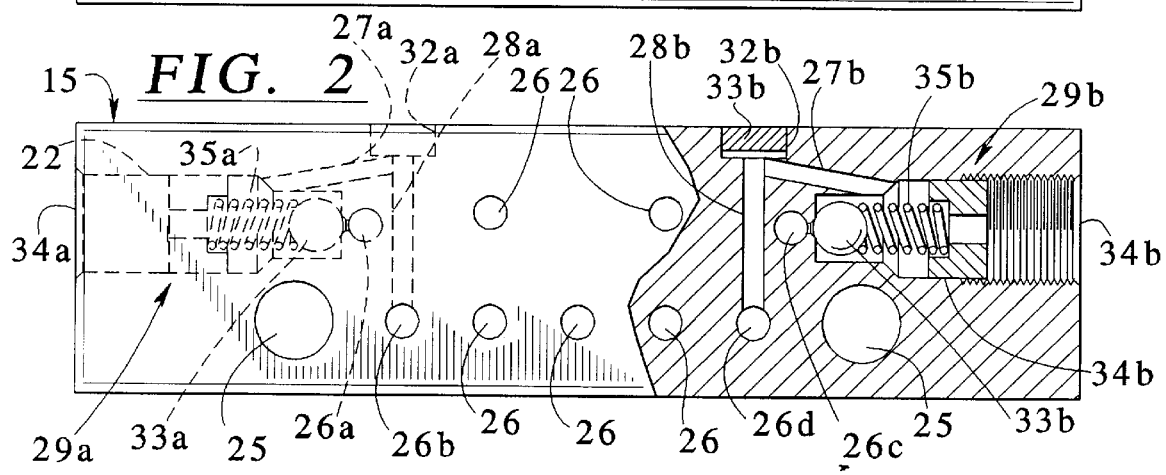
FIG. 3
FIG. 2
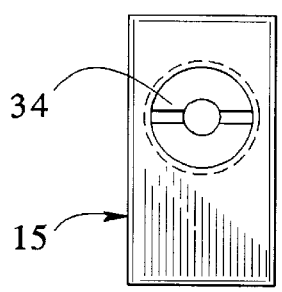
FIG. 4

PRESSURE BYPASS ACCESSORY FOR A SERIES PROGRESSIVE DIVIDER VALVE

BACKGROUND OF THE INVENTION

1. Field of the Invention

The present invention relates generally to the field of lubricant distributor valves, and more particularly to lubricant distributor valves. More specifically, the present invention relates to lubricant distributor valves that are constructed, adapted and arranged to operate cyclically and which meter and discharge a predetermined quantity of lubricant to each of a number of points of use, such as bearings, in a sequence.

2. Description of the Prior Art

Lubricant distributor valves of the type generally described above are known in the art and are commonly referred to as series progressive divider valves. Most often, series progressive divider valves are constructed of a number of separate valve blocks which are sandwiched together between an inlet block unit and an end block unit, with all of the units being held together by bolts. This type of construction enables the various units to be separated and removed from each other for cleaning, repair and, if necessary, replacement of one or more units.

Such a series progressive divider valve is described, for example, in U.S. Pat. No. 4,312,425 issued to Snow, wherein each of the valve blocks has an identical structure formed of two parts, namely a base part and a feeder part. The feeder part includes a bore within which a movable spool is disposed. By means of suitable hydraulic circuitry, the respective spools in the series of valve units are progressively operated so as to cause lubricant to be cyclically distributed from an output port in each valve unit. The number of valve units which are employed for a given purpose is dependent on the number of locations requiring lubrication, with more identical valve units simply being added on as needed.

The base member and the spool member in each valve unit are held together by bolts extending through both parts, so that the parts can be separated for the aforementioned purposes of cleaning, repair or replacement. An advantage of this type of structure for a series progressive divider valve is that, because of the identical structure of each valve unit, manufacture and assembly are greatly simplified.

However, the series progressive divider valve of U.S. Pat. No. 4,312,425 suffers from two disadvantages. First, because of the identical structure of each valve unit, the location and interconnection of each of the lubricant output ports of the overall assembly cannot be varied within the divider valve itself, and if such variation is desired for a particular application, additional valving and/or lubrication delivery lines must be employed in combination with the valve assembly. Second, if one lubricant output port becomes blocked, the transmission of lubricating fluid to succeeding output ports is blocked often resulting in the shut down of the entire system.

Therefore, the series progressive valve of U.S. Pat. No. 4,312,425 suffers from two shortcomings: a lack of flexibility in design or variation amongst the individual feeder and base units and the inability to divert lubricant to succeeding output ports in the event one output port becomes blocked.

An improvement over the series progressive divider valve of U.S. Pat. No. 4,312,425 is provided in U.S. Pat. No. 5,480,004, also issued to Snow. U.S. Pat. No. 5,480,004 teaches the use of a manifold for a series progressive divider valve which enhances provides flexibility and customization. Again, the divider valve is formed of a plurality of identical, adjacent valve units each having a base part and a feeder part. However, the manifold of U.S. Pat. No. 5,480,004 is insertable between the base part and the feeder part of one or more valve units to achieve the desired porting. The manifold is in the form of at least one plate, having a plurality of bores therein in registry with the passages communicating between a base part and a feeder part of a valve unit, so that the manifold can be inserted between the base part and the feeder part to preserve the normal passage of fluid between the base part and the feeder part. These bores proceed vertically through the plate forming the manifold. In order to provide customization, the plate also has at least one additional bore therein, drilled through a side of the plate so as to proceed in a plane which extends through the vertically-proceeding bores. The additional bore is disposed in the plate so as to provide a fluid communication path between at least two of the vertically proceeding bores, thereby providing a new and different fluid flow path between the base part and the feeder part. The delivery of fluid (lubricant) can therefore be diverted or augmented from its "normal" path (the "normal" path being the flow path which would exist in the absence of the manifold plate).

The manifold of the U.S. Pat. No. 5,480,004 can be formed by multiple plates of this type, each plate having a different interconnection path therein by virtue of a differently oriented additional bore or bores, so that a high degree of selectivity is achieved in varying the porting for the divider valve.

However, U.S. Pat. No. 5,480,004 does not address one of the major problems in applying series progressive technology - - - the problem of a blocked lubrication output line or feeder blockage. Previously, if one feeder unit in the system becomes blocked, the entire system shuts down because there is no way to divert flow of lubricant to the next or succeeding valve unit. Therefore, it would be desirable to provide an improvement to existing series progressive divider valves whereby in the event one lubrication output line becomes blocked, the fluid is diverted to the next line so that the entire system is not shut down.

SUMMARY OF THE INVENTION

It is an object of the present invention to provide a series progressive valve assembly of the type formed by a plurality of identical valve units disposed between an end block unit and an inlet block unit, wherein the interconnection of lubricant outlet ports within the valve assembly can be varied so as to divert fluid around a blocked port to a succeeding port, while preserving the identical structure of each valve unit.

It is a further object of the present invention to provide a series progressive divider valve constructed from a series of identical modules, wherein one or more modules can be selectively varied so as to divert the delivery of lubricant from a preceding output port to a succeeding output port in the event the preceding output one becomes blocked.

The above and other objects are achieved in accordance with the principles of the present invention in a manifold for a series progressive divider valve. The divider valve is formed from a plurality of identical, adjacent valve units, each having a base part and a feeder part, with a manifold being insertable between the base part and the feeder part of one or more valve units to achieve the desired pressure relief. The manifold may be provided in the form of at least one plate, having a plurality of bores therein in registry with the passages communicating between the base part and the feeder part of the valve unit. In the alternative, the manifold may be incorporated into the base part or the feeder part which would eliminate the need for an extra plate disposed between the base part and the feeder part.

The bores of the manifold proceed vertically through the plate structure of the manifold. The plate also has at least one additional further bore drilled therein and at least one pressure relief valve. The pressure relief valve and further bores are disposed between two non-communicating bores. For purposes of clarity, these two bores will be referred to as the first bore and the second bore. The pressure relief valve is disposed between the first bore and the further bore; the further bore is disposed between the pressure relief valve and the second bore. In the event there is a blockage or restriction at the first bore, pressure within the first bore is communicated to the pressure relief valve which is normally biased in the closed position. When the pressure in the first bore becomes sufficient to overcome the bias of the pressure relief valve, the valve is opened thereby establishing communication between the first bore, through the pressure relief valve, through the further bore to the second bore. Lubricating fluid is then bypassed around the blockage in the first bore to the second bore. Accordingly, fluid is then communicated from the second bore to the succeeding valve unit. Therefore, the blockage prevents lubrication from being delivered to the output of the first bore only as opposed to the outputs of all of the succeeding valve units. Consequently, the function of the divider valve largely continues without a complete shut down of the system.

In a preferred embodiment, indicator ports, also known as accessory ports or alternative outlets, are equipped with a visual indicator which alerts an operator to the blockage when the bias of the relief valve has been overcome by the pressure within the first bore.

In yet another preferred embodiment, each valve unit, i.e. each pair of base and feeder units is equipped with a pressure relief manifold designed in accordance with the present invention, either as a separate plate or incorporated into either the base or feeder unit.

Since each valve unit can be provided with its own manifold, the possibility of an incorrect installation is minimized. Only the valve section which is modified by the insertion of the manifold is altered, with all of the other valve sections remaining identical.

In an embodiment, the present invention provides a method for producing a selected flow pattern in a series progressive divider valve assembly. The method of the present invention includes the steps of assembling a plurality of valve units in a succession adjacent to each other, each valve unit having a plurality of non-communicating passages therein and extending between a lower region of the valve unit and an upper region of the valve unit. The method further includes the step of providing a manifold that has a plurality of bores therein including a first bore and a second bore. The method further includes the step of disposing the manifold between the lower region and the upper region of at least one valve unit so that the bores in the manifold are disposed in matching registry with the passages in at least one of the valve units.

In an embodiment, the method of the present invention further includes the step of providing at least one relief valve biased towards a closed position between the first bore and the second bore and at least one further bore in the manifold between the relief valve and the second bore for placing the first and second bores in fluid communication and the passages of at least one valve unit in registry with the first and second bores when the pressure in the first bore is sufficient to overcome the bias of the relief valve.

In an embodiment, the present invention provides a method for modifying a fluid pattern in a progressive divider valve assembly in response to a restriction of flow in the assembly. The method of the present invention comprises the steps of arranging a plurality of valve units, each valve unit having a plurality of non-communicating passages therein which extend between a lower region and an upper region of each valve unit for establishing a first flow configuration in the valve units. The method further includes the step of disposing a manifold between the lower region and the upper region of at least one valve unit for reacting to a pressure increase in either the lower or upper region and converting the first flow configuration into a second, different flow configuration wherein at least two of the passages are in fluid communication with each other.

In an embodiment, the method further includes an additional step of providing a plate as the manifold providing a first bore and a second bore in the plate and a relief valve disposed between the first bore and the second bore with a further bore disposed between the relief valve and the second bore. The relief valve is biased into a closed position. When sufficient pressure exists in the first bore to overcome the bias of the relief valve, the relief valve is moved to an open position and acts in combination with the further bore for establishing communication between the first bore and the second bore.

In an embodiment, the present invention provides a method of manufacturing a series progressive divider valve assembly as described above which includes the steps of providing an inlet block with a lubricant inlet, forming a plurality of valve units by combining a base part and an associated feeder part. Each base part has at least one lubricant outlet port and each feeder part has a hydraulically actuatable element disposed therein for causing lubricant to be delivered to the outlet port of its associated base part. Each feeder part and associated base part have faying surfaces with each faying surface having a set of openings of non-communicating passages therein.

The method further includes the step of forming each valve unit by abutting the faying surfaces of the base part and an associated feeder part with the openings in the base part and associated feeder part in registry. The method then includes the step of arranging a plurality of valve units between the inlet unit and the end block unit. The method then includes the step of providing a manifold having a plurality of bores therein including a first bore and a second bore. The method then includes the step of disposing the manifold of at least one of the valve units between the respective faying surfaces of the base part and the feeder part thereof with the bores of the manifold disposed in registry with the openings in the faying surfaces. Then, the method includes the step of providing at least one relief valve in the manifold biased toward a closed position and disposed between the first and second bore and at least one further bore in the manifold disposed between the relief valve and the second bore for placing the first and second bores fluid communication and the passages in at least one valve unit respectively in registry therewith in fluid communication when the pressure in the first bore is sufficient to overcome the bias of the relief valve.

The method further includes the step of fastening the inlet block unit, the end block and the base parts in a fixed assembly, fastening each feeder part in the fixed assembly only to its associated base part and, in the at least one valve unit, fastening the feeder part and its associated base part in fixed assembly with the manifold therebetween.

DESCRIPTION OF THE DRAWINGS

FIG. 1 is a perspective view of a series progressive divider valve assembly incorporating a manifold constructed in accordance with the principles of the present invention.

FIG. 2 is a bottom view of a first embodiment of a plate forming a manifold constructed in accordance with the principles of the present invention, for use in the assembly of FIG. 1.

FIG. 3 is a side view of the plate shown in FIG. 2.

FIG. 4 is an end view of the plate shown in FIG. 2.

DESCRIPTION OF THE PREFERRED EMBODIMENTS

Figure 5:
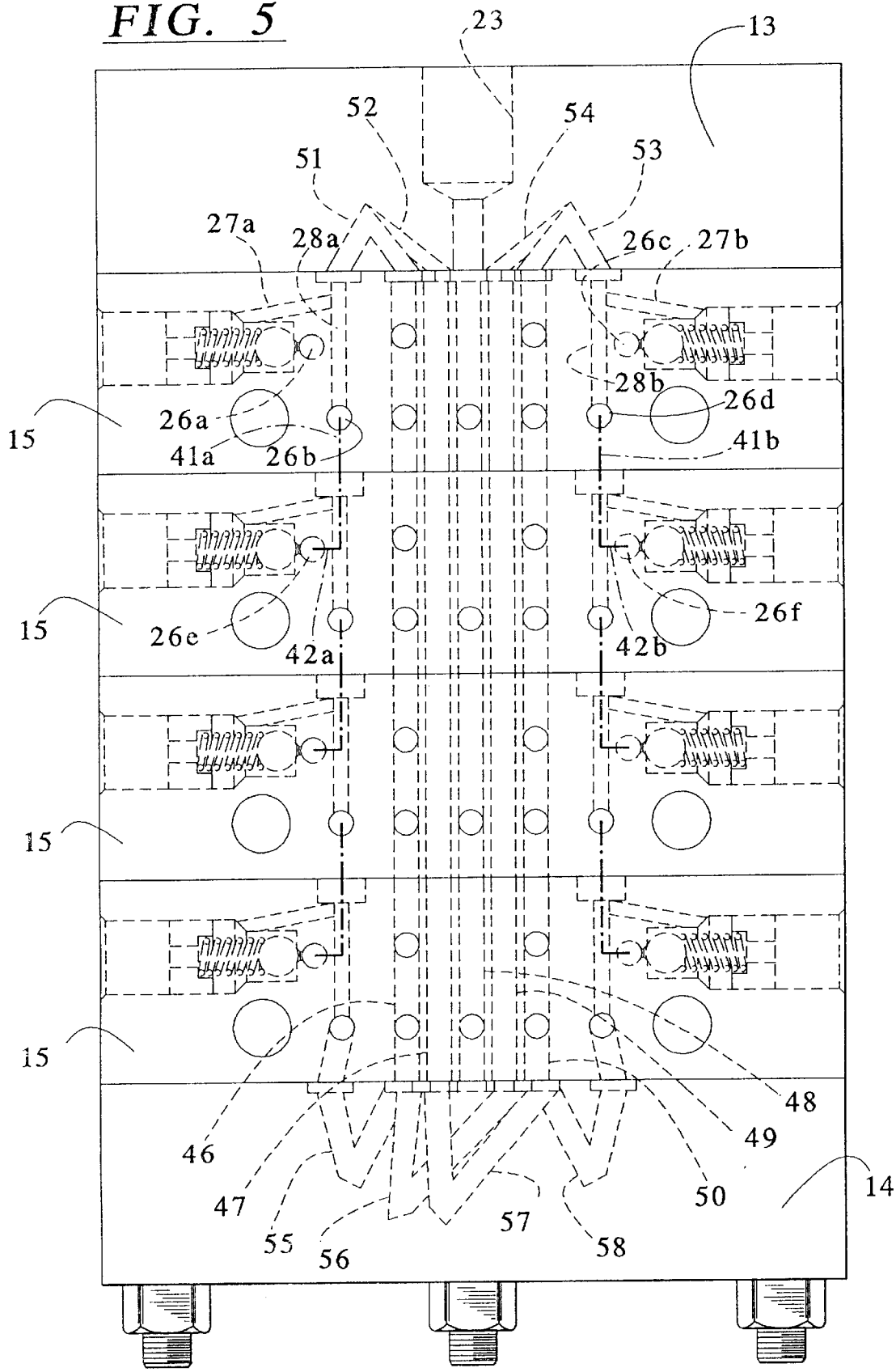
FIG. 5 is a bottom view of a divider valve assembly incorporating four manifold plates of the embodiment of FIG. 2, showing the resulting crossporting.

A series progressive divider valve assembly 10 is shown in FIG. 1, formed by a number of identical valve units, each valve unit being formed by a base part 11 and a feeder part 12, disposed between an inlet block 13 and an end block 14. The divider valve assembly 10, except for the manifold 15 described below, has the structure, and operates, as disclosed in U.S. Pat. Nos. 4,312,425 (Cyclic Lubricant Distributor Valve, Snow et al.) and 5,480,004 (Crossport and Singling Manifold for a Series Progressive Divider Valve), the teachings of which are incorporated herein by reference. Accordingly, only the details of the assembly 10 which are necessary to explain the structure and operation of the manifold 15 or equivalent modification to either a feeder part 12 or base part 11 will be specifically discussed below.

The base part 11 and the feeder part 12 of each valve unit are held together by bolts 16. The inlet block 13 and the end block 14, with the valve units 11, 12 therebetween, are held together by bolts 17, only one of which is shown in FIG. 1. Each bolt 17 extends through each of the end block 14, the valve units 11, 12, and into the inlet block 13. An end of the bolt 17 which is disposed in the inlet block 13 is threaded, or otherwise secured inside the inlet block 13, however, all of the valve units, as well as the end block 14, have respective bores therein which are in registry and which receive each bolt 17 without restraint. The inlet block 13, the valve units and the end block 14 are held tightly together by nuts 18, which are respectively threaded onto the bolts 17.

The divider valve assembly 10 shown in FIG. 1, therefore, is a completely modular assembly, with each of the valve units as well as the end block 14 being separable from each other and from the inlet block 13 and each feeder part 12 is separable from its associated base part 11. Although the manifold 15 disclosed below will be described in the context of such a completely modular assembly, it will be apparent that the manifold 15 could be employed in a non-modular valve assembly as well. Further, the function of each manifold 15 can also be incorporated into the assembly 10 by modifying a feeder part 12 or a base part 11 as discussed below.

Each feeder part 12, also known as a spool unit, has a bore 21 extending the entire width thereof, in which a valve spool (not shown) is disposed and is movable by hydraulic actuation to selectively distribute lubricant in a sequence via an output port 22 in each of the base parts 12. After the spool has been placed in the bore 21, each end of the bore 21 is plugged by a threaded plug (not shown) to create a closed chamber in which the spool slides laterally. The feeder units 12 also include a pair of feeder indicator ports shown at 19. The feeder unit 12 that is disposed above the manifold plate 15 further includes pressure indicators 20 which are described in detail in FIGS. 6, 7 and 8.

Each of the valve units formed by a base part 11 and a feeder part 12 is preferably of an identical structure. Each base part 11 and feeder part 12 has a plurality of vertical non-communicating passages therein, which are in registry when the feeder part 12 is in place on its associated base part 11. Dependent on the position of the spool valve within the bore 21 as a result of hydraulic actuation, one or more of these passages is placed in fluid communication with a passage extending the length of the valve assembly which is, in turn, in fluid communication with an inlet port 23. Lubricant entering the valve assembly via the inlet port 23 is thereby directed in a sequence out of each threaded output port 22, dependent on the respective positions of the spools in the bores 21 of each feeder part 12.

The vertically proceeding passages in each base part 11 and feeder part 12 are not shown in detail. However, the respective positions can be seen in the bottom view of the assembly shown in FIG. 5. The reader is also referred to FIGS. 8, 9, and 10 of U.S. Pat. No. 5,480,004.

In the divider valve assembly 10 shown in FIG. 1, a manifold formed by a plate 15 is shown inserted between the base part 11 and the feeder part 12 of one of the valve units. Further details of this manifold 15 are shown in FIGS. 2, 3 and 4. As can be seen in FIG. 2, the manifold 15 contains two bores 25 for respectively receiving the bolts 16 which hold the feeder part 12 and the base part 11 together, with the plate 15 sandwiched therebetween. The plate 15 has a plurality of further vertically proceeding bores 26 therein, which are respectively in registry with the vertically proceeding passages in the feeder part 12 and in the base part 11. Each bore 26, preferably at the faying surface at a bottom of the plate 15, is provided with an annular recess or rim (not shown), which receives a resilient grommet (not shown), which serves as a seal.

The plate 15 has two further bores 27, 28 drilled through a side of the plate 15 at each end thereof. The bores 27, 28 extend in a plane proceeding substantially perpendicularly to the vertical bores 26. The further bore 28a is disposed so as to extend through at least a portion of the vertically proceeding bore 26b. Similarly, the further bore 28b is disposed so as to extend through at least a portion of the vertically proceeding bore 26d. The bores 27a and 28a establish communication between the bores 26a and 26b by way of the ball valve 29a in the event there is a blockage at bore 26a. Similarly, the bores 27b and 28b establish communication between the bores 26c and 26d by way of the ball valve 29b in the event there is a blockage at bore 26c. The ball valves 29a and 29b are disposed within the threaded output ports 22. The force of the springs 35a, 35b against the balls 33a, 33b may be adjusted by tightening or loosening the threaded caps 34a, 34b.

The further bore 28b has an enlarged region 32b near the exterior of the plate 15, which is closed by a plug 33b (see also FIG. 1). The further bore 28a has a similar enlarged region 32a for a plug 33a (not shown in FIG. 2, see FIG. 1). The plug 32a forms a closed chamber permitting fluid flow between the bores 26a and 26b. The plug 32b forms a closed chamber permitting fluid flow between the bores 26c and 26d.

FIG. 3 illustrates a side view of the manifold plate 15, particularly illustrating the location of the plugs 32a, 32b. FIG. 4 is an end view of the manifold plate 15, particularly illustrating the end cap 34. When the pressure within the first bore 26a is sufficient to overcome the bias of the spring 35a against the ball 33a, the ball 33a moves laterally toward the left in FIG. 2 thereby collapsing the spring 35a against the cap 34a and establishing flow between the bore 26a and the bore 27a. Similarly, when the pressure in the first bore 26c is sufficient to overcome the bias of the spring 35b, the ball 33b moves to the right in FIG. 2 thereby collapsing the spring 35b against the cap 34b and establishing flow between the bore 26c and the bore 27b.

The bores 26a, 26c are in communication with indicator ports shown at 19 in FIG. 1. The indicator ports 19 which are in communication with the vertical bores 26 accommodate a pressure indicator shown at 20. As shown in FIGS. 1, 6, 7 and 8 described below, when the pressure in the bores 26a, 26c is sufficient to overcome the bias of the springs 35a, 35b respectively, the pressure also causes the pins 61 of the visual indicators 20 disposed to extend upward thereby providing a visual indication of the high pressure situation.

A divider valve assembly 10 is shown in FIG. 5, in which four manifold plates corresponding to the manifold plate 15 shown in FIG. 2 are incorporated. The valve assembly 10 shown in FIG. 5 is illustrated as having four valve units, as opposed to the three valve units shown in the valve assembly 1 of FIG. 1, to indicate the expandability of the assembly. The fluid connections produced by the respective bores 27a and 28a are illustrated by dashed lines in FIG. 5, showing that the vertical bores 26a and 26b are connected in fluid communication with each other, and that vertical bores 26c and 26d are connected in fluid communication with each other. Further, the bore 26b is in communication with a passage 41a in the base part 11 below the plate 15 which is in fluid communication with a passage 42a, which in turn is in communication with a passage 26e in the adjacent base part 11. The interconnection of the bore 26a with the bore 26b therefore results in the interconnection between the bore 26a and the bore 42a of the next or adjacent base unit 11 as well as the bore 26e of the next or adjacent manifold plate 15. Similarly, the interconnection of the bore 26c with the bore 26d causes a passage 41b in the base part 11 below the plate 15 to be in fluid communication with a passage 42b of the adjacent base part 11, which in turn is in registry with a passage 26f of the adjacent manifold plate 15.

At each location wherein passages communicate between adjacent valve units or blocks, the passage is provided with a recess which receives a resilient grommet functionally similar to the grommets discussed and illustrated in U.S. Pat. No. 5,480,004.

As also shown in FIG. 5, for illustrative purposes only, the assembly 10 has a number of internal passages extending the length thereof, formed by respective, identical passages in each base part 11. Each base part 11, accordingly, has respective passages 46, 47, 48 and 49 and 50 therein. Further, each base part 11 has the respective passages 41 and 42. The passages 41 and 42 are shown in FIG. 5 as phantom lines only due to their approximate alignment with the manifold passages shown at 28.

In the inlet block 13, a passage 51 connects the passage 46 to the passages shown at 41a and 42a in the base unit 11. A passage 52 connects the passage 47 to another passage (not shown) at a different level in the base part 11. A passage 53 connects the passage 50 to the passages shown at 41b and 42b. A passage 54 connects the passage 49 to another passage (not shown) at a different level in the base part 11.

Additionally, each base part 11 is provided with a central passage 48 extending the length of the valve assembly 10, which is in communication with the inlet port 23, and through which input lubricant is supplied to each valve unit. In the end block 14, passages 55, 56, 57 and 58 provide further connections between the respective passages.

Figure 6:
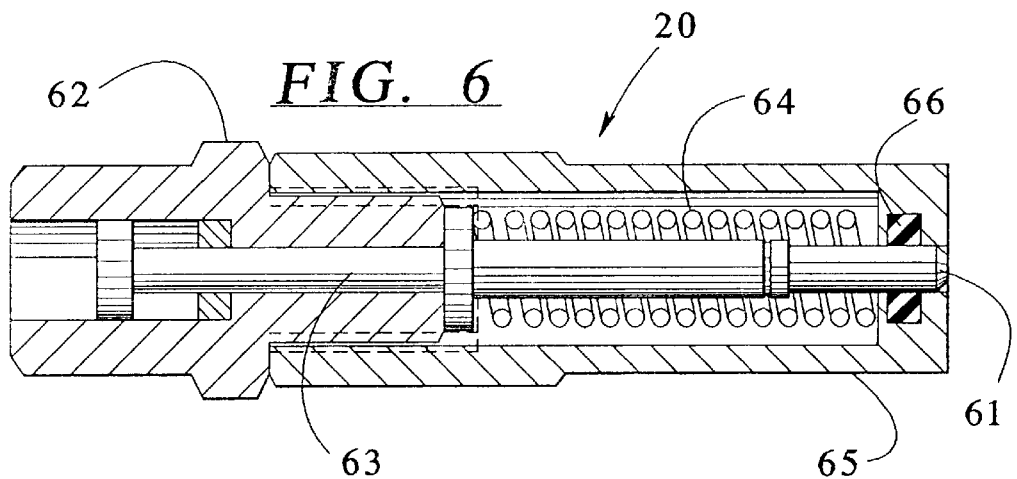
FIG. 6 is a sectional view of the pressure indicator at normal operating conditions.
Figure 7:
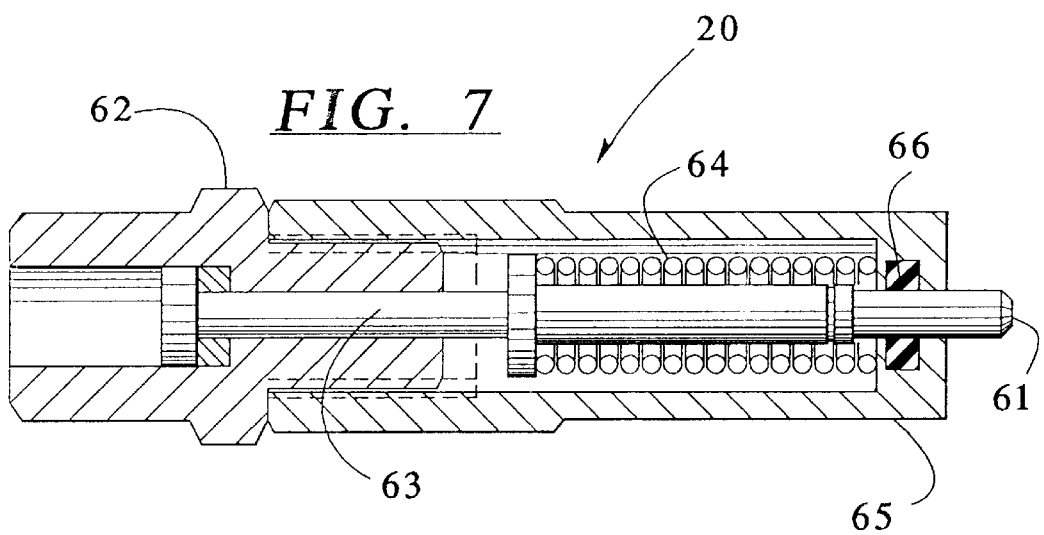
FIG. 7 is a sectional view of the pressure indicator at high pressure conditions.
Figure 8:
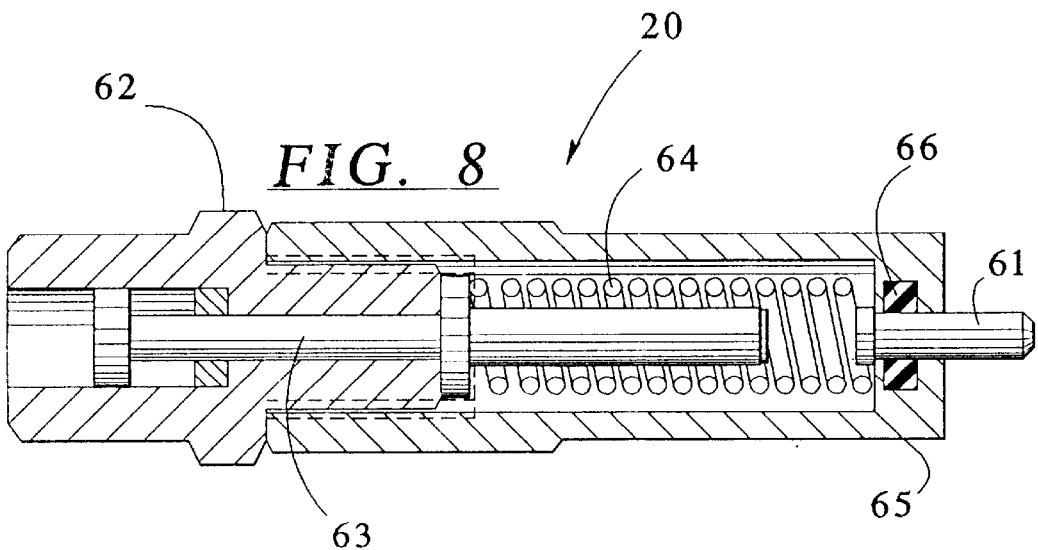
FIG. 8 is a sectional view of the pressure indicator after a high pressure condition has been alleviated but before the pin has been reset.

FIG. 6 is a sectional view of the pressure indicator 20 at normal operating conditions. FIG. 7 is a sectional view of the pressure indicator 20 at high pressure operating conditions. FIG. 8 is a sectional view of the pressure indicator 20 after a high pressure condition has been alleviated, but before the pin 61 has been reset. The base portion 62 of the indicator 20 is screwed into the threaded feeder indicator ports shown at 19 in FIG. 1. When a manifold plate 15 is utilized, the indicator ports 19 of the feeder units 12 are in communication with the vertically extending ports 26a or 26c as shown in FIG. 2. In the event a high pressure condition occurs in the ports 26a or 26c, pressure within the ports pushes the piston 63 upward against the spring 64 which, in turn, pushes the pin 61 through the opening in the cap 65. Once the pin 61 is pushed through the opening in the cap 65, the O-ring 66 holds the pin in place until it is reset manually. Thus, as illustrated in FIG. 8, even though the high pressure condition has been relieved and the piston 63 has moved back downward to the left as shown in FIG. 8, the O-ring 66 holds the pin 61 in the pushed-out position until it is reset manually.

The pressure indicators shown at 20 in FIGS. 6–8 come in a variety of designs or styles. For example, a variety of such indicators are sold under the TRABON® and MAN-ZEL® trademarks by Lubriquip, Inc. of Cleveland, Ohio. Accordingly, the pressure indicator illustrated in FIGS. 6–8 is one of many varieties that may be utilized in accordance with the present invention.

Although modifications and changes may be suggested by those skilled in the art, it is intended to embody within the patent warranted hereon all changes and modifications as reasonably and properly come within the scope of his contribution to the art.

What is claimed is:

1. In a series progressive divider valve assembly having a plurality of adjacent valve units, each valve unit having a plurality of non-communicating passages therein extending between a lower region of the valve unit and an upper region of the valve unit, the improvement comprising:

a manifold disposed between the lower region and the upper region of at least one valve unit, the manifold comprising a plurality of bores including a first bore and a second bore therein respectively disposed in registry with the passages in the at least one valve unit, the manifold further comprising at least one relief valve biased in a closed position and disposed between the first and second bores, the manifold further comprising at least one further bore disposed between the relief valve and the second bore, the relief valve and further bore placing the first and second bores and the passages respectively in registry therewith in fluid communication when pressure in the first bore is sufficient to overcome the bias of the relief valve.

2. The improvement of claim 1 wherein the manifold is integral with the lower region of the valve unit.

3. The improvement of claim 1 wherein the manifold is integral with the upper region of the valve unit.

4. The improvement of claim 1 further comprising a visual indicator for indicating when the pressure in the first bore is sufficient to overcome the bias of the relief valve.

5. The improvement of claim 4 wherein the visual indicator is located on the upper region of the valve unit.

6. The improvement of claim 1 wherein the lower region and the upper region of each valve unit are separable, and wherein the manifold comprises at least one plate insertable between the lower region and the upper region of a valve unit.

7. In a series progressive divider valve assembly having a plurality of adjacent valve units, each valve unit having a plurality of non-communicating passages therein extending between a lower region and an upper region of a valve unit, and establishing a first flow configuration for that valve unit, the improvement comprising:

manifold means disposed between the lower region and the upper region of at least one valve unit for reacting to a pressure increase in either the lower or upper region and converting the first flow configuration into a second, different flow configuration wherein at least two of the passages are in fluid communication with each other.

8. The improvement of claim 7 wherein the manifold is integral with either the upper or lower region of the valve unit.

9. The improvement of claim 7 wherein the means for reacting to a pressure increase comprises a relief valve disposed between a first bore and a second bore and a further bore disposed between the relief valve and the second bore, the relief valve being biased into a closed position, the relief valve being in an open position and, in combination with the further bore, establishing communication between the first bore and the second bore when sufficient pressure exists in the first bore to overcome the bias of the relief valve.

10. The improvement of claim 9 further comprising a visual indicator for indicating when the pressure in the first bore is sufficient to overcome the bias of the relief valve.

11. The improvement of claim 10 wherein the visual indicator is located on the upper region of the valve unit.

12. The improvement of claim 7 wherein the lower region and the upper region of each valve unit are separable, and wherein the manifold means comprises at least one plate insertable between the lower region and the upper region of a valve unit.

13. A series progressive divider valve assembly comprising:

an inlet block unit having a lubricant inlet;
an end block unit;
a plurality of valve units disposed between the inlet unit and the end block unit;
each of the valve units comprising a base part and an associated feeder part, each base part having at least one lubricant outlet port and each feeder part having a hydraulically actuatable element therein for causing lubricant to be delivered to the outlet port of its associated base part, each feeder part and associated base part having respective faying surfaces abutting one another, each of the faying surfaces having a set of openings of non-communicating passages therein, with the openings in the base part and the associated feeder part being in registry;
means, including the passages, forming hydraulic circuitry in the inlet block unit, the end block unit and the valve units for interconnecting the inlet, the hydraulically actuatable elements and the outlets for cyclic operation of the valve units, the hydraulic circuitry interconnecting each feeder part with its associated base part only through the faying surfaces;
a manifold disposed in at least one of the valve units between the respective faying surfaces of the base part and the feeder part thereof, the manifold comprising a plurality of bores therein respectively disposed in registry with the openings including a first bore and a second bore, the manifold further comprising a relief valve disposed between the first bore the second bore, the manifold further comprising at least one further bore disposed between the relief valve and the second bore, the relief valve and further bore placing the first and second bores and the openings respectively in registry therewith in fluid communication when pressure in the first bore is sufficient to overcome the bias of the relief valve;
first fastening means for fastening the inlet block unit, the end block and the base parts in a fixed assembly; and
second fastening means for fastening each feeder part in fixed assembly only to its associated base part and in the at least one valve unit for fastening the feeder part and its associated base part in fixed assembly with the manifold therebetween.

14. The series progressive divider valve assembly as claimed in claim 13 wherein the feeder comprising having a passage in communication with the first bore, the feeder port further comprising a visual indicator for indicating when the pressure in the first bore is sufficient to overcome the bias of the relief valve.

15. The series progressive divider valve assembly as claimed in claim 13 wherein the manifold comprises a manifold plate having the bores extending in a first direction and disposed generally in a vertical plane having the at least one further bore therein extending generally in a second direction perpendicular to the first direction.

16. A method for producing a selected flow pattern in a series progressive divider valve assembly comprising the steps of:

assembling a plurality of valve units in succession adjacent each other, each valve unit having a plurality of non-communicating passages therein extending between a lower region of the valve unit and an upper region of the valve unit;
providing a manifold having a plurality of bores therein including a first bore and a second bore;
disposing the manifold between the lower region and the upper region of at least one valve unit so that the bores in the manifold are respectively disposed in registry with the passages in the at least one valve unit; and
providing at least one relief valve biased toward a closed position between the first and the second bore and at least one further bore in the manifold between the relief valve and the second bore for placing the first and second bores in fluid communication and the passages in the at least one valve unit respectively in registry therewith in fluid communication when the pressure in the first bore is sufficient to overcome the bias of the relief valve.

17. The method as claimed in claim 16 further comprising the step of providing a visual indicator for indicating when the pressure in the first bore is sufficient to overcome the bias of the relief valve.

18. The method as claimed in claim 16 wherein the step of providing a manifold comprises providing a manifold plate having the bores and the further bore therein.

19. A method for modifying a fluid flow pattern in a progressive divider valve assembly in response to a restriction of flow in the assembly, the method comprising the following steps:

arranging a plurality of valve units, each valve unit having a plurality of non-communicating passages therein extending between a lower region and an upper region of each valve unit, for establishing a first flow configuration in the valve units; and disposing a manifold between the lower region and the upper region of at least one valve unit for reacting to a pressure increase in either the lower or upper region and converting the first flow configuration into a second, different flow configuration wherein at least two of the passages are in fluid communication with each other.

20. The method as claimed in claim 19 comprising the additional step of providing a plate as the manifold and providing a first bore and a second bore in the plate and a relief valve disposed between a first bore and a second bore and a further bore between the relief valve and the second bore, the relief valve being biased into a closed position, the relief valve being in an open position and, in combination with the further bore, establishing communication between the first bore and the second bore when sufficient pressure exists in the first bore to overcome the bias of the relief valve.

21. The method as claimed in claim 19 further comprising the step of providing a visual indicator for indicating when the pressure in the first bore is sufficient to overcome the bias of the relief valve.

22. A method for manufacturing a series progressive divider valve assembly comprising the steps of:

providing an inlet block unit with a lubricant inlet;

forming a plurality of valve units by combining a base part and an associated feeder part, each base part having at least one lubricant outlet port and each feeder part having a hydraulically actuatable element therein for causing lubricant to be delivered to the outlet port of its associated base part, each feeder part and associated base part having respective faying surfaces with each faying surface having a set of openings of non-communicating passages therein;

forming each valve unit by abutting the faying surfaces of the base part and an associated feeder part with the openings in the base part and the associated feeder part in registry;

arranging a plurality of valve units between the inlet unit and the end block unit;

providing a manifold having a plurality of bores therein including a first bore and a second bore;

disposing the manifold in at least one of the valve units between the respective faying surfaces of the base part and the feeder part thereof with the bores of the manifold disposed in registry with the openings in the faying surfaces;

providing at least one relief valve in the manifold biased toward a closed position and disposed between the first and the second bore and at least one further bore in the manifold disposed between the relief valve and the second bore for placing the first and second bores in fluid communication and the passages in the at least one valve unit respectively in registry therewith in fluid communication when the pressure in the first bore is sufficient to overcome the bias of the relief valve;

fastening the inlet block unit, the end block and the base parts in a fixed assembly; and fastening each feeder part in the fixed assembly only to its associated base part and in the at least one valve unit fastening the feeder part and its associated base part in the fixed assembly with the manifold therebetween.

* * * * *